United States Patent [19]

Yoshida et al.

[11] Patent Number: 4,802,206
[45] Date of Patent: Jan. 31, 1989

[54] CALLING SYSTEM FOR ENABLING SPEECH TRANSMISSION FROM A CALLER TO A CALLED BUSY PARTY IN A TELEPHONE SYSTEM

[75] Inventors: Tadahiro Yoshida; Michinori Hatabe, both of Kawasaki, Japan

[73] Assignee: Nitsuko Limited, Kawasaki, Japan

[21] Appl. No.: 755,425

[22] Filed: Jul. 16, 1985

[30] Foreign Application Priority Data

Jul. 17, 1984 [JP] Japan .................................. 59-147007

[51] Int. Cl.[4] ......................... H04M 3/20; H04M 3/56
[52] U.S. Cl. .................................. 379/158; 379/204; 379/208
[58] Field of Search ............... 379/158, 204, 205, 208, 379/215, 202, 203, 218, 157

[56] References Cited

U.S. PATENT DOCUMENTS

| | | | |
|---|---|---|---|
| 3,509,285 | 4/1970 | Banks et al. | 379/208 |
| 3,991,282 | 11/1976 | Feil | 379/158 |
| 4,424,418 | 1/1984 | Moore et al. | 379/204 |

FOREIGN PATENT DOCUMENTS 012165 2/1981 Japan .................................. 379/208

Primary Examiner—Thomas W. Brown
Attorney, Agent, or Firm—Roberts, Spiecens & Cohen

[57] ABSTRACT

A telephone exchange equipment system for enabling transmission of a speech message from a fresh calling party to another busy party without interruption of the connection for the original conversation. Each of the telephone sets are connected to the exchange equipment through a four-wire cable comprising a transmitting line and a receiving line. The exchange equipment is provided with a mixer having two input terminals and an output terminal. During a time period when a first telephone set communicates with a second telephone set, when the exchange equipment receives a first telephone selection signal and a predetermined connection requirement signal from a third telephone set, the exchange equipment connects the transmitting lines of the second and third telephone sets to the two input terminals of the mixer while connecting the receiving line of the first telephone set to the output terminal of the mixer and maintaining the connection between the transmitting line of the first telephone set and the receiving line of the second telephone set.

6 Claims, 6 Drawing Sheets

CALLING SYSTEM FOR ENABLING SPEECH TRANSMISSION FROM A CALLER TO A CALLED BUSY PARTY IN A TELEPHONE SYSTEM

BACKGROUND OF THE INVENTION (1) Field of the Invention

The present invention relates to a telephone system and, in particular, to a calling system from a party for a busy party.

(2) Description of the Prior Art

In a conventional telephone system, a plurality of telephone sets are connected to exchange equipment through two-wire or four-wire telephone lines. Any one of the telephone sets can be connected to another one through the exchange equipment. When two telephone sets are connected to each other through the exchange equipment, the exchange equipment rejects a call from another telephone set for connection with any one of the busy telephone sets and sends out a, so called, busy tone to the calling telephone set.

In actual use of the telephone system, when a person sometimes desires to give information to a party communicating with another party without interruption of the communication and without the information being transmitted to the other party, he must physically come to the party to orally convey the information or to show him a memorandum having the information. However, it is inconvenient for a remote person physically to come to the party.

A conference call system is known and used in the prior art wherein several telephone sets can be called by a telephone set and those telephone sets are connected to one another for enabling conversation among them.

In the conference call system, a call for any one of the busy parties from a third party is also rejected.

As a system for enabling a calling party to be connected to a called busy party, a call waiting system is known in the prior art. During a conversation between a first party and a second party, a ringing signal is sent out to the first party in response to a call for the first party from a third party. When the first party effects a hooking operation, the first party is connected to the third party in place of the second party, while the second party is held. However, in the system, the call from the third party cannot be completed in the absence of the hooking operation of the called first party. Further, the connection between the first and third parties results in a temporary interruption of the conversation between the first and second parties.

SUMMARY OF THE INVENTION

It is an object of the present invention to provide a telephone system wherein, during a connection between two parties, a third party can call one of the busy parties and can communicate with the called busy party without interruption of the original connection but without the communication being transmitted to the other busy party.

It is another object of the present invention to provide telephone exchange equipment having a plurality of telephone sets connected thereto through four-wire lines wherein, during a time period when two telephone sets are connected for conversation to each other through the exchange equipment, a transmitting line of a third party can be connected to a receiving wire of one of the busy two telephone sets as being required by the third telephone set without interruption of the connection between the two busy telephone sets.

A known telephone exchange equipment for a plurality of telephone sets, each telephone set being connected thereto through a four-wire line comprising a transmitting line and a receiving line, comprises a switching network for connecting the transmitting line and the receiving line of one telephone set to he receiving line and the transmitting line of another telephone set, respectively, and a control circuit for controlling the switching network. According to the present invention, the telephone exchange equipment is provided with combining circuit means having two input terminals and an output terminal and for combining two input signals through the input terminals, the combined signal is output at the output terminal, and means for detecting a connection requiring signal sent out from a first one of the telephone sets at a time after the first telephone set has called a second telephone set which is busy and connected to a third telephone set. In response to a detection output from the connection requiring signal detecting means, the control circuit controls the switching network so that the transmitting lines of the first and third telephone sets are connected to the two input terminals, respectively, of the combining circuit means, while the receiving line of the second telephone set is connected to the output terminal of the combining circuit means. Thereby a speech can be transmitted from the first telephone set to the second telephone set without interruption of the original connection between the second and third telephone sets.

Further objects, features, and other aspects of the invention will be easily understood from the following detailed description of preferred embodiments referring to the accompanying drawings.

DETAILED DESCRIPTION OF PREFERRED EMBODIMENTS

Figure 1:
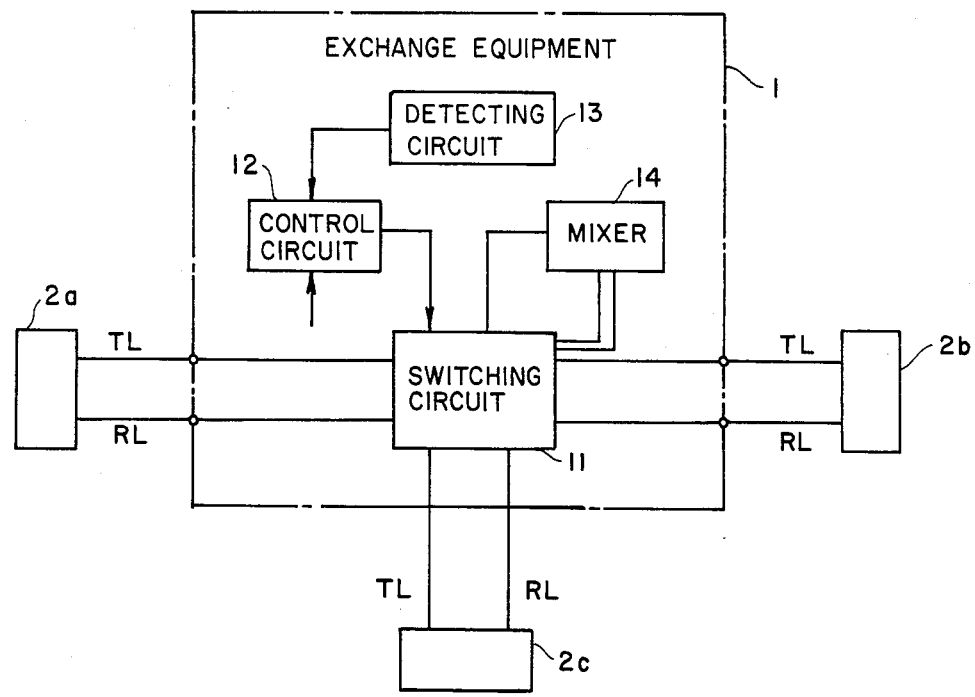
FIG. 1 is a block diagram of an embodiment according to the present invention.

Referring to FIG. 1, a telephone system according to an embodiment of the present invention comprises telephone exchange equipment 1 and a plurality of telephone sets (three being shown at 2a–2c in FIG. 1) connected to exchange equipment 1 through four-wire lines, each four-wire line comprising a transmitting line TL and a receiving line RL.

Telephone exchange equipment 1 includes a switching circuit 11 for selectively connecting one telephone set to another telephone set and a control circuit 12 similar to conventional telephone exchange equipment in the prior art.

When receiving a selection signal, for example, a dial impulse signal from a telephone set 2c for selecting a telephone set 2a, control circuit 12 controls switching circuit 11 to connect the transmitting and receiving lines TL and RL of telephone set 2c to the receiving and transmitting lines RL and TL of telephone set 2a so as to establish a speech path between the two telephone sets 2c and 2a.

When the called telephone set 2a is busy due to connection with telephone set 2b, the control circuit alternatively drives a busy tone generator (not shown) to transmit a busy tone to the receiving line RL of the calling telephone set 2c so as to reject the call.

Each telephone set is provided with an input means for a connection requirement signal, according to the present invention.

In one aspect, the connection requirement signal is generated by a hooking operation at the telephone set, or a dialling operation of a special code after the hooking operation.

In another aspect, each telephone set is provided with a key as the input means in a key telephone system.

Exchange equipment 1 further comprises a detecting circuit 13 for detecting the connection requirement signal, and a mixing, or combining, circuit 14 having two input terminals and an output terminal which are connected to switching circuit 11.

When telephone set 2c receives the busy tone and when the connection requirement signal is sent out to exchange equipment 1, detecting circuit 13 detects the connection requirement signal and applies a detecting signal to control circuit 12.

Figure 2:
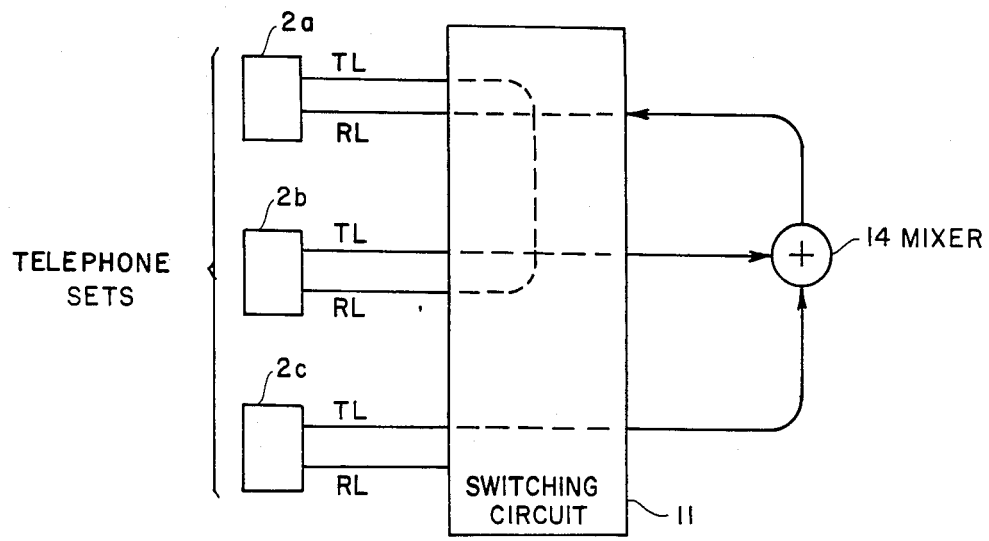
FIG. 2 is a schematic view illustrating a condition of the embodiment wherein a third party is connected to one of two telephone sets in communication with each other.

Then, control circuit 12 controls the switching circuit 11 so as to connect the receiving line RL of the called busy telephone set 2a to the output terminal of mixing circuit 14, and to connect the transmitting lines TL of the other busy telephone set 26 and the calling telephone set 2c to the input terminals of mixing circuit 14, respectively, as shown in FIG. 2.

Thus, the speech from calling telephone set 2c is transmitted to the receiving line RL of the called busy telephone set 2a through switching circuit 11 and mixing circuit 14, so that the speech can be transmitted to the party at the telephone set 2a from another telephone set 2c.

The connection of the transmitter line TL of telephone set 2a and the receiving line RL of telephone set 2b is maintained as is and since the speech from telephone set 2b is transmitted to receiving line RL of telephone set 2a through switching circuit 11 and mixing circuit 14, the original connection for communication between telephone sets 2a and 2b is not interrupted and is maintained.

The present invention is quite useful in application to a private branch-exchange equipment.

Figure 3:
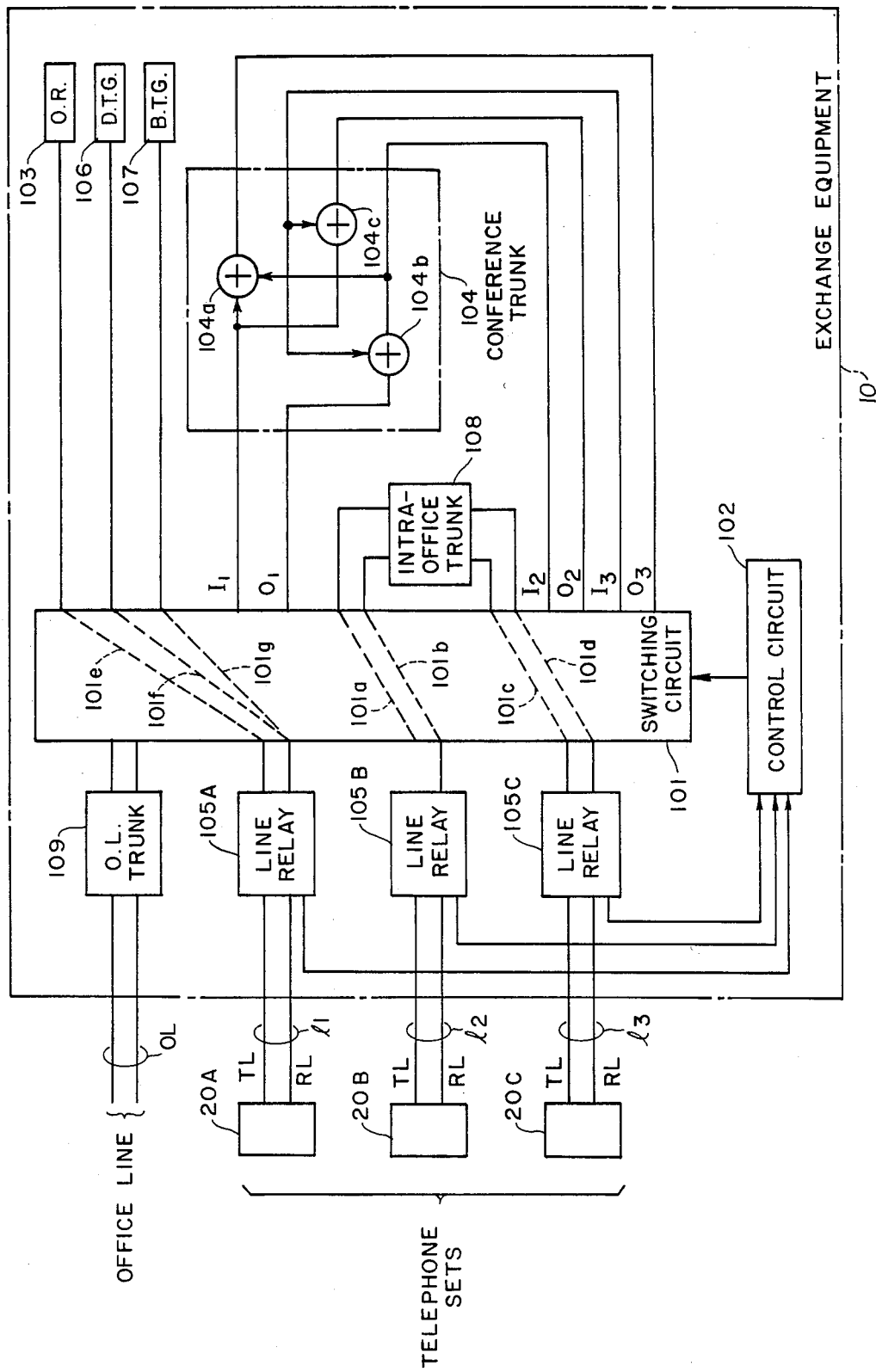
FIG. 3 is a block diagram of another embodiment.

Referring to FIG. 3, a plurality of telephone sets (three sets are shown at 20A-20C) are connected to private branch-exchange equipment 10 (which will be referred to as PBX) through four-wired extension lines $l_1$-$l_3$. PBX 10 comprises a switching circuit 101, a control circuit 102, an originating register (OR) 103 and a conference trunk (CT) 104.

Each extension line $l_1$-$l_3$ is connected to switching circuit 101 through a line relay (LR) 105A-105C. Originating register 107 is connected to switching circuit 101, and a dial tone generator (DTG) 106 and a busy tone generator (BTG) 107 are also connected to the switching circuit.

Conference trunk 104 is known in the prior art and has three input terminals $I_1$-$I_3$ and three output terminals $O_1$-$O_3$, which are connected to switching circuit 101. The conference trunk comprises three adders 104a-104c, each adder being connected to two input terminals and to one output terminal so as to combine two input signals to provide the combined signal from the output terminal.

The PBX is further provided with an intra-office trunk (IOT) 108 for supplying a ringing signal, a speech current and the like to telephone sets 20A-20C.

Control circuit 102 is connected to line relays 105A-105C and originating register 103, and receives various signals therefrom. The control circuit also controls switching circuit 101, dial tone generator 106 and busy tone generator 107, as described hereinafter.

Assuming that two telephone sets 20B and 20C are connected to each other through line $l_1$, line relay 105B, paths 101a and 101b in switching circuit 101, intra-office trunk 108, paths 101c and 101d, line relay 105c, and line $l_3$, and that a fresh call is originated at telephone set 20A, operation will be described additionally referring to FIGS. 4-6.

Figure 5:
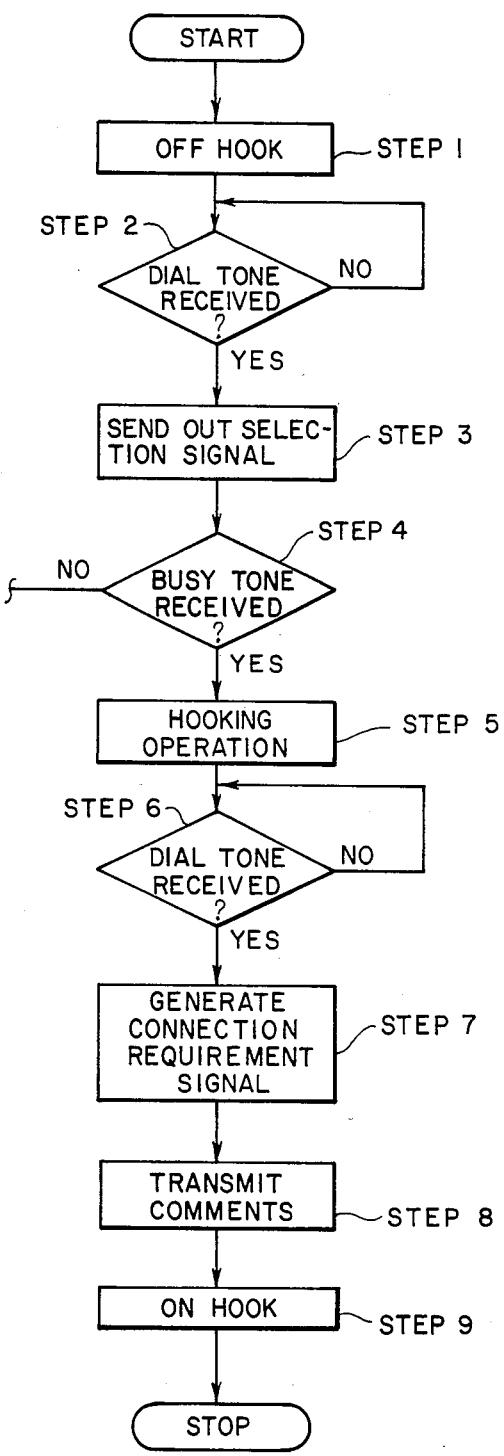
FIG. 5 is a time flow chart illustrating operation of a third party for calling a busy party in the embodiment of FIG. 3.

When a handset is off-hooked at telephone set 20A (Step 1 in FIG. 5, line relay 105A detects the off-hook signal and applies a call originating signal to control circuit 102. Upon receipt of the signal (Step 1 in FIG. 6), control circuit 102 controls switching circuit 101 to establish a path 101e for connecting transmitting line TL of line $l_1$ and originating register 103 and another path 101f for connecting receiving line RL of line $l_1$ and dial tone generator 106 (Step 2 in FIG. 6). Then, control circuit 102 drives dial tone generator 106 (Step 3 in FIG. 6). When receiving the dial tone (Step 2 in FIG. 5), the calling party operates a dial or push button of the telephone set 20A to send out the selection signal for selecting, for example, telephone set 20C (Step 3 in FIG. 5).

The selection signal is received at originating register 103 and is transmitted to control circuit 102.

Figure 6:
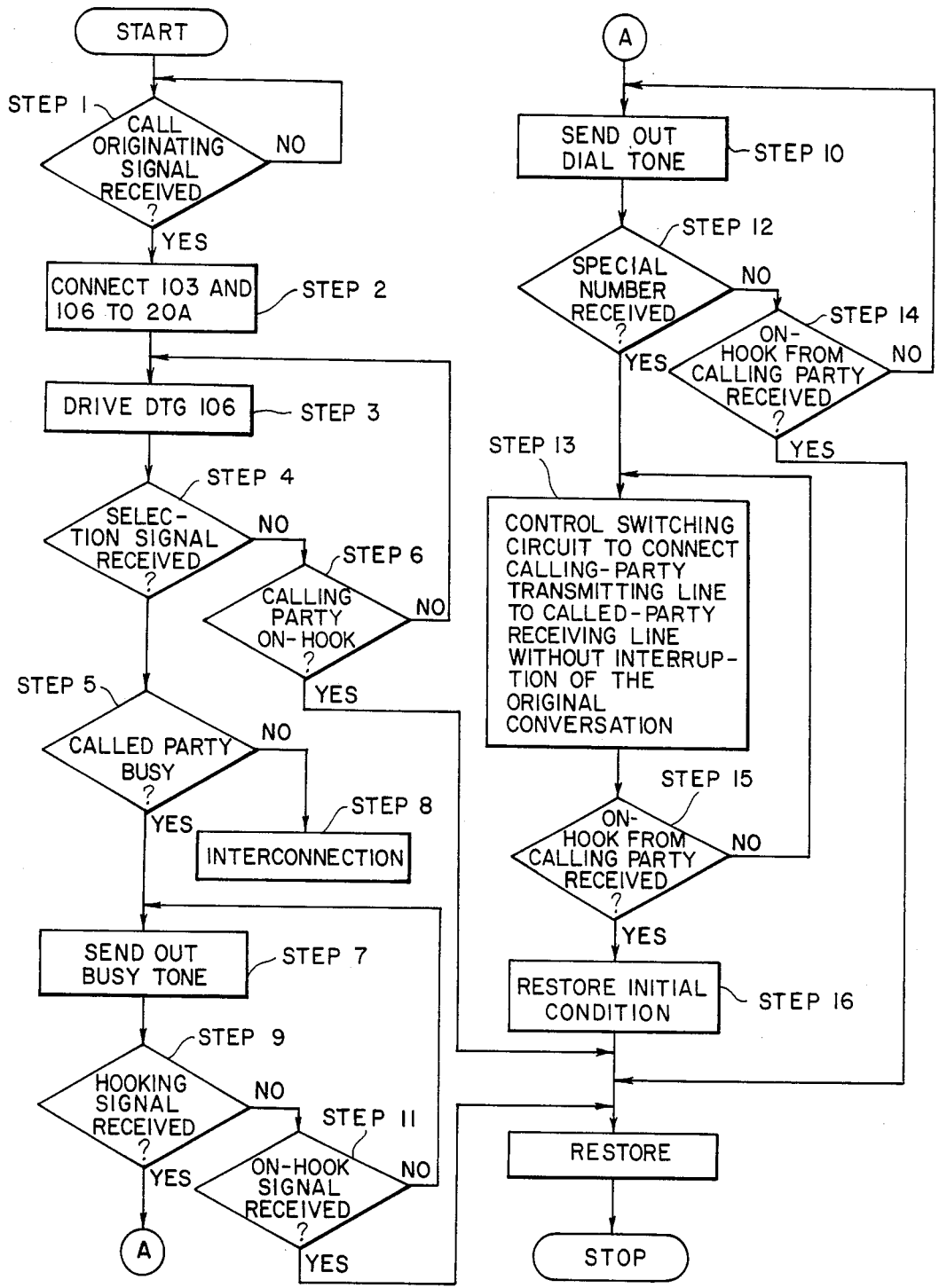
FIG. 6 is a time flow chart illustrating operation of a control circuit in the embodiment of FIG. 3, in response to the operation of the third party of FIG. 5.

When control circuit 102 receives the selection signal (Step 4 in FIG. 6), it detects whether the called telephone set 20C is busy or not (Step 5 in FIG. 6).

If an on-hook signal is received at line relay 105A before receiving the selection signal from telephone set 20A (Step 6 in FIG. 6), the control circuit 102 controls switching circuit 101, originating register 103, and dial tone generator 106 is restored to the initial condition.

If the telephone set 20C is busy, control circuit 102 controls switching circuit 101 to establish a path 101g in place of path 101f so as to connect the receiving line RL of telephone set 20A and busy tone generator 107, and drives busy tone generator 107 so that a busy tone is sent out to telephone set 20A (STEP 7 in FIG. 6).

If the telephone set 20C is not busy, control circuit 102 controls switching circuit 101 to connect line $l_1$ and line $l_2$ through the switching circuit and intra-office trunk 108 (Step 8 in FIG. 6) in the conventional exchanging manner.

When receiving the busy tone (Step 4 in FIG. 5), the calling party operates the hook switch of telephone set 20A to send out a hooking signal (Step 5 in FIG. 5), if he desires to establish a speech path with the called busy party of telephone set 20C.

When line relay 105A receives the hooking operation, it transmits the signal to control circuit 102.

When receiving the hooking signal (Step 9 in FIG. 6), control circuit 102 controls switching circuit 101 so that the receiving line RL of telephone set 20A is connected to dial tone generator 106 through path 101f in place of path 101g. Simultaneously, control circuit 102 drives dial tone generator 106 to send out the dial tone to telephone set 20A (Step 10 in FIG. 6).

If the calling party hangs up the handset in place of the hooking operation, the control circuit 102 receives the on-hook signal (Step 11 in FIG. 6), and controls the switching circuit 101, originating register 103 and busy tone generator 107 into the initial condition.

When the calling party receives the dial tone (Step 6 in FIG. 5), he operates the dial or the push-buttons to generate a connection requirement signal (Step 7 in FIG. 5).

A special code or number should be predetermined for requiring connection of a calling party to a called busy party.

When receiving the connection requirement signal, originating register 103 transmits the signal to control circuit 102.

Figure 4:
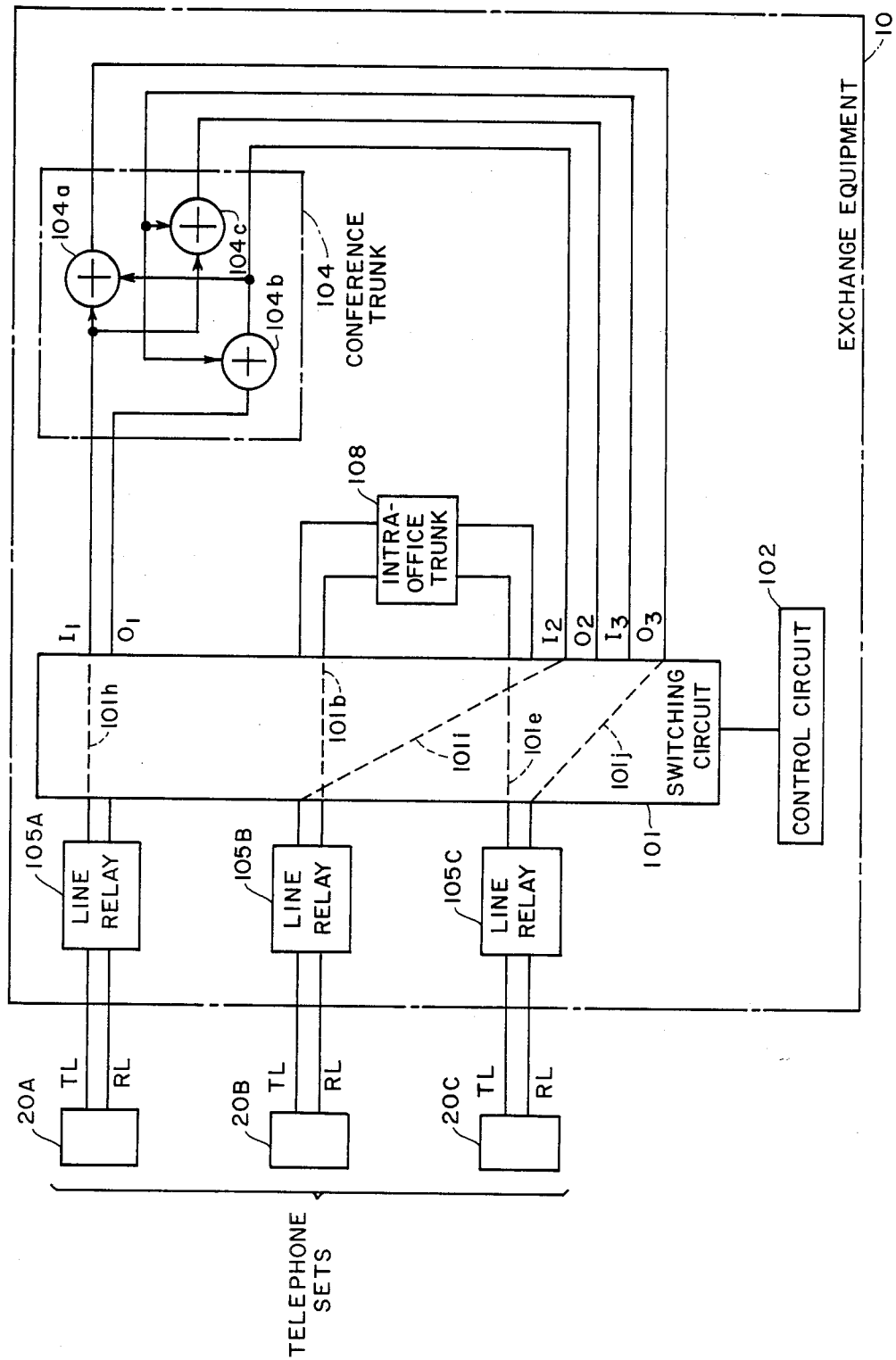
FIG. 4 is a view illustrating a condition of the embodiment of FIG. 3 where a third party is connected to one of two telephone sets in communication with each other.

In response to reception of the connection requirement signal (Step 12 in FIG. 6), control circuit 102 controls switching circuit 101 to establish paths 101h–101j as shown in FIG. 4 (Step 13 in FIG. 6). That is, the transmitting line TL of calling telephone set 20A is connected to input terminal $I_1$ of conference trunk 104 through path 101h, transmitting line TL of telephone set 20B being connected to input terminal $I_2$ of conference trunk 104 through path 101i in place of path 101a, and receiving line RL of called busy telephone set 20C connected to output terminal $O_3$ through path 101j in place of path 101d.

In the above condition, speech signals from telephone sets 20A and 20B are supplied to conference trunk 104 through paths 101h and 101i, respectively, and combined at adder 104a in the conference trunk. The combined speech signal is transmitted to receiving line RL of telephone set 20C through conference trunk output $O_3$ and path 101j. Since paths 101b and 101c are maintained, speech from telephone set 20C is transmitted to telephone set 20B. Therefore, the original speech connection between telephone sets 20B and 20C is not interrupted but maintained, while speech can be transmitted to telephone set 20C from telephone set 20A.

If control circuit 102 does not receive the connection requirement signal but an on-hook signal from telephone set 20A (Step 14 in FIG. 6), the control circuit, switching circuit 101 and originating register 103 are restored to the initial condition.

After the calling party completes the conversation with the party at telephone set 20A (Step 8 in FIG. 5), he hangs up the handset (Step 9 in FIG. 5). Then, line relay 105A receives the on-hook signal. When control unit 102 receives the signal from the line relay 105A (Step 15 in FIG. 6), it controls switching circuit 101 to disconnect conference trunk 104 and to reestablish initial paths 101a and 101d in place of paths 101i and 101j. Therefore, the original speech path between telephone sets 20B and 20C is restored (Step 16 in FIG. 6), and control circuit 102 is restored to the initial condition before the call is originated at telephone set 20A.

During a time period when telephone set 20C is connected to an office line OL and is busy, connection from a telephone set 20A or 20B to the receiving line RL of the busy telephone set 20C can be realized in the similar manner. In FIG. 3, 109 is an office line trunk.

In the present embodiment, a conference trunk having three adders has been used. However, a single adder is used for enabling transmission of speech signals from a telephone set to another busy telephone set. Accordingly, a mixer can be used in place of the conference trunk.

Figure 7:
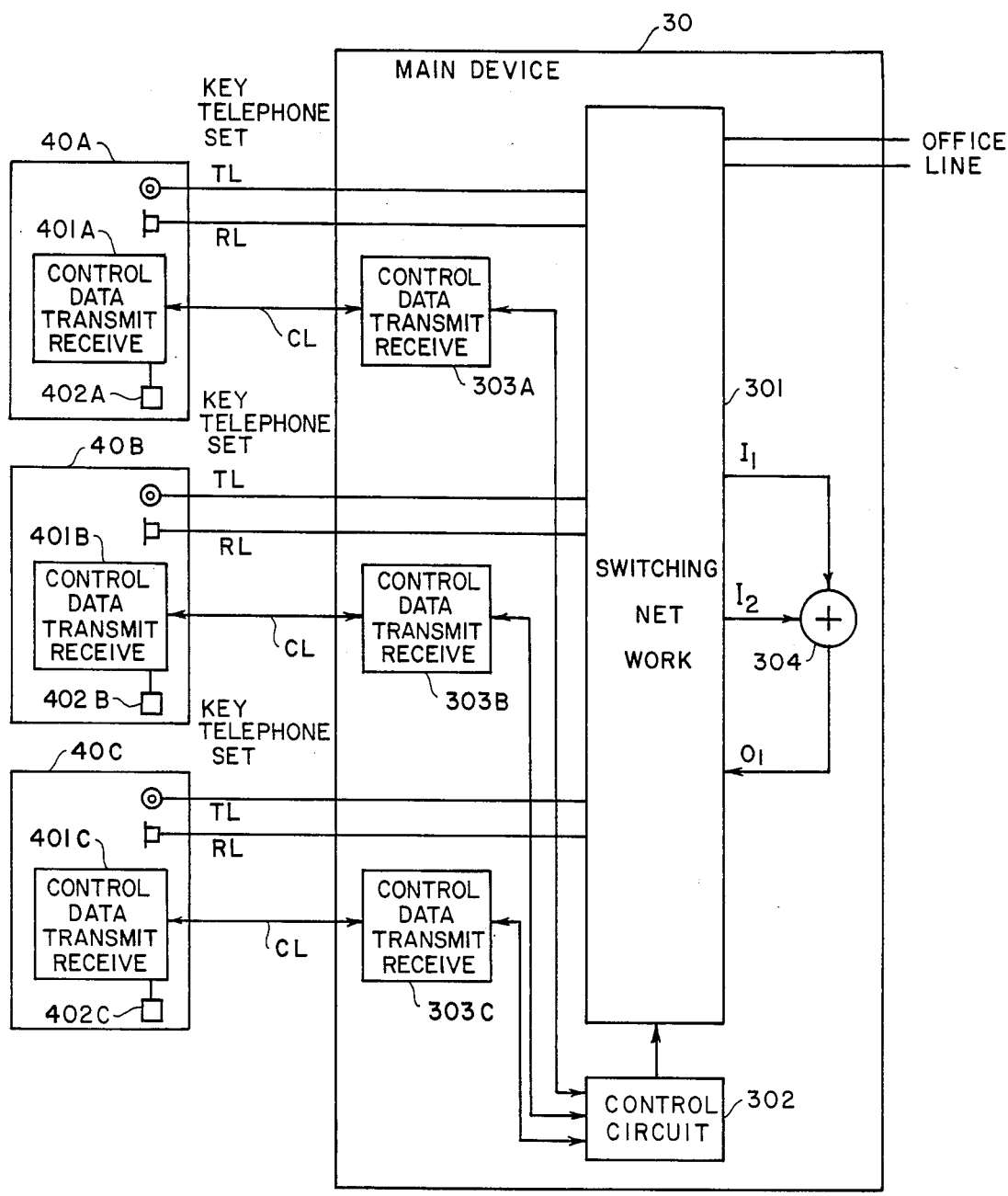
FIG. 7 is a block diagram of another embodiment according to the present invention.

The present invention can also be applied to a key telephone system as shown in FIG. 7.

Referring to FIG. 7, a key telephone system shown therein comprises a main device 30 and a plurality of key telephone sets (three sets 40A–40C shown therein), similar to a known key telephone system.

Each key telephone set 40A–40C is connected to main device 30 through a four-wire cable for a transmitting line TL and a receiving line RL, and also through a control line CL.

As well known in the art, in the key telephone system, communication of control data between each key telephone set 40A–40C and main device 30 is effected through the speech line but the control line CL. Each key telephone set 40A–40C is provided with a plurality of keys (not shown) for inputting control data, such as an office line selection, an extension set selection, holding and the like. Each key telephone set 40A–40C also has a control data transmitter/receiver 401A–401C for transmitting the inputted control data to main device 30 and for receiving control data, such as lamp control data, buzzer control data and the like, from main device 30. Main device 30 comprises a switching network 301 for connecting lines TL and RL of one key telephone set to those of others or the office line as desired, under control of a control circuit 202. The main device also has control data transmitter/receivers 303A–303C connected to control lines CL, respectively. Each control data transmitter/receiver receives control data from the corresponding key telephone set and transmits the data to control circuit 302 and also transmits control data from control circuit 302 to the corresponding key telephone set.

According to the present invention, the main device 302 is provided with a mixer 304 having two input terminals $I_1$ and $I_2$ and an output terminals $O_1$.

A known conference trunk can be used as the mixer.

Each telephone set 40A–40C is provided with an additional key 402A–402C for inputting a connection order connection to a busy party.

A speech path can be established in the known manner between each telephone set and another or the office line.

When any speech signals are to be transmitted from telephone set 40A to another telephone set 40C which is busy under a condition of communication with another telephone set 40B, the connectionc an be completed in a similar manner described in relation to the embodiment of FIGS. 3–6, except that all control data are transmitted through control lines CL and that the connection requirement is inputted not by dialling a special number but by pushing the additional key 402A.

After a handset is lifted off hook telephone set 40A and an extension set selection key for selecting telephone set 40C is pushed, the additional key 402A is pushed. Control circuit 302 receives selection information of telephone set 40C and connection requirement information from control data transmitter/receiver 303A. Then, control circuit 302 controls switching network 301 so that transmitting lines TL of calling telephone set 40A and busy telephone set 40B are connected to input terminals I$_1$ and I$_2$ of mixer 304 while receiving line RL of called busy telephone set 40C is connected to output terminal O$_1$ of the mixer. The connection of receiving line RL of telephone set 40B and transmitting line TL of telephone set 40C is maintained as it was.

Accordingly, the speech path between telephone sets 40B and 40C is maintained without interruption and speech signals at telephone set 40A are transmitted to the receiver of the telephone set 40C together with speech signals from telephone set 40B.

What is claimed is:

1. In a telephone exchange equipment for a plurality of telephone sets, each telephone set being connected to the equipment through a four-wire line comprising a transmitting line and a receiving line, the equipment comprising a switching network for connecting the transmitting line and the receiving line of one telephone set to the receiving line and the transmitting line of another telephone set, respectively, and a control circuit for controlling said switching network, the improvement which comprises:

a combining circuit means having two input terminals and an output terminal for combining two signals at said two input terminals to produce a combined signal at said output terminal;

means for detecting a connection requiring signal sent out from a first one of said telephone sets at a time after said first telephone set has called a second telephone set which is busy due to connection with a third telephone set through said switching network which has established a speech path between said second and third telephone sets; and said control circuit controlling said switching network in response to a detection output signal from said connection requiring signal detecting means so that the transmitting lines of said first and third telephone sets are connected to said two input terminals, respectively, of said combining circuit means, and the receiving line of said second telephone set is connected to said output terminal of said combining circuit means, while the transmitting line of said second telephone set remains connected through said switching network to the receiving line of said third telephone set, whereby a speech path is established from said first telephone set to said busy second telephone set without interrupting the speech path between said second and third telephone sets.

2. The telephone exchange equipment arrangement as claimed in claim 1, wherein said connection requiring signal comprises a hooking signal and a predetermined special number dialing signal produced at said first telephone set.

3. The telephone exchange equipment arrangement as claimed in claim 1, which comprises a conference trunk means having a plurality of adder means, one of said adder means being used as said combining circuit means.

4. In a key telephone system comprising a main device and a plurality of key telephone sets, each set being connected to said main device through a four-wire line comprising a transmitting line and a receiving line and through a control line, said main device comprising a switching network and a control circuit for controlling said switching network according to selection information through said control line from a first one of said key telephone sets to establish a speech path between said first key telephone set and a second key telephone set identified by said selection information, the improvement which comprises:

said main device being provided with a combining circuit means having two input terminals for receiving speech signals and an output terminal for producing a combined speech signal;

each telephone set being provided with an additional key for inputting a command for connection with a telephone set; and said control circuit, in response to a selection signal received through said control line from a third one of said key telephone sets during a time when a speech path is established between said first and second key telephone sets, controlling said switching network so that the receiving line of said one of said first and second key telephone sets is connected to said output terminal of said combining circuit means, and the transmitting lines of said third telephone set and the other one of said first and second telephone sets are connected to said two input terminals of said combining circuit means, respectively, while the transmitting line of said one telephone set remains connected through said switching network to the receiving line of said other telephone set, such that a speech signal can be transmitted from said third telephone set to said one of said first and second telephone sets without interrupting the speech path between said first and second telephone sets.

5. The telephone exchange equipment arrangement as claimed in claim 1 wherein said switching network is controlled by said control circuit in response to the detection output signal from the connection requiring signal detecting means so that the receiving line of said first telephone set is unconnected to the second and third telephone sets.

6. The key telephone system arrangement as claimed in claim 4 wherein said switching network is controlled by said control circuit in response to said selection signal so that the receiving line of said third telephone is unconnected to the first and second telephone sets.

* * * * *